No. 845,799. PATENTED MAR. 5, 1907.
J. C. LINDNER Jr.
HANGER FOR PIPES AND CONDUITS.
APPLICATION FILED MAR. 21, 1906.
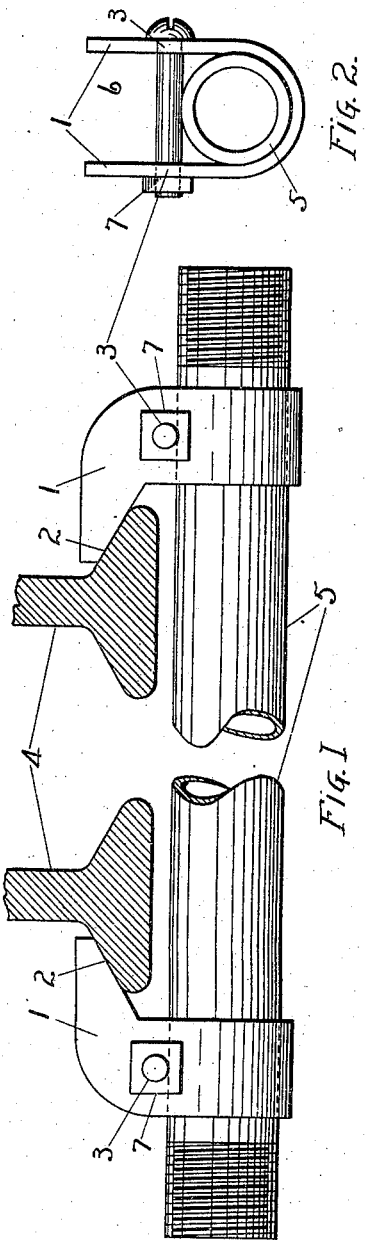
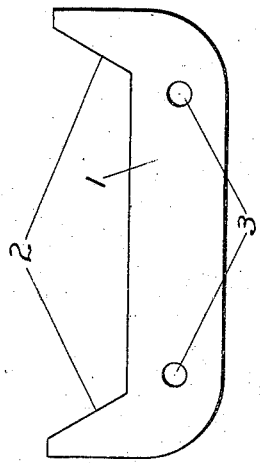
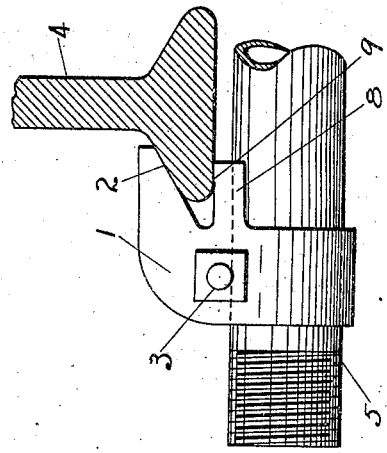
Witnesses
Inventor
John C. Lindner Jr.

UNITED STATES PATENT OFFICE.

JOHN C. LINDNER, JR., OF BUFFALO, NEW YORK, ASSIGNOR OF ONE-HALF TO JAMES D. ROBERTSON, OF BUFFALO, NEW YORK.

HANGER FOR PIPES AND CONDUITS.

No. 845,799.      Specification of Letters Patent.      Patented March 5, 1907.

Application filed March 21, 1906. Serial No. 307,288.

*To all whom it may concern:*

Be it known that I, JOHN C. LINDNER, Jr., a citizen of the United States, residing at Buffalo in the county of Erie and State of New York, have invented a new and useful Improvement in Hangers for Pipes and Conduits, of which the following is a specification.

My invention relates to improvements in hangers for supporting pipes, conduits, and the like carrying electric wires beneath, from, or upon the I-beams and the like used as joists or otherwise in buildings and other structures.

The objects of my invention are to cheapen the cost of such supports, increase their effectiveness, and make it possible to economize the time of workmen in applying them.

I accomplish the objects of my invention by means of a metallic strip bent into a form or shape somewhat like that of a horseshoe, having heel-calks, but no toe-calk, as shown in the accompanying drawings.

Figure 1 is a perspective view of a pipe supported in place by my improved hanger. Fig. 2 is an end view showing clearly the clamping-bolt and its location upon the pipe, which is an important feature of the improved hanger. Fig. 3 is a perspective view of a modification of the hanger, showing an extra lug 8 for limiting the upward movement of the pipe; and Fig. 4 is a perspective view of the blank after being perforated and before it is bent into the shape desired.

In each figure of the drawings like numerals of reference refer to like parts—that is to say—

1 is the flat lateral projection designed to extend over and upon the I-beam 4, as shown, and 2 is the edge or contact surface of the projection.

3 is the clamping-bolt, and 4 the I-beam or joist.

5 represents pipe or conduit, and 6 the space between the projections and the extremities of the hanger.

7 is the nut upon the clamping-bolt, and 8 is the lug upon the modification shown in Fig. 3.

With this device the clamping force is exerted upon the pipe or conduit and not upon the beam or joist, thus rigidly securing the hanger in its place upon the pipe or conduit, and by placing one hanger on the right-hand side of a beam, as shown at Fig. 1, and another hanger on the left-hand side of the same or an adjoining beam or joist the pipe or conduit can be secured rigidly, so as to prevent it from moving either forward or backward in its place, as will be readily seen.

If it is desired to provide against the upward movement of a pipe supported below the joist, the hanger may be provided with a lug, as shown in Fig. 3, and by increasing the length of the hanger the pipe may be supported at any distance desired below or away from a beam or joist, as will be readily seen.

I have shown the hanger as provided with perforations through which a bolt may be passed, and by means of the nut thereon the hanger may be clamped to the pipe or conduit; but other clamping devices may be used, if desired. I much prefer the bolt, and for this reason—that is to say, by making the perforations at the proper distance from the center of the blank—the bolt will when being tightened in its place force itself down upon the pipe, and thereby wholly prevent any rocking of the hanger and will thus prevent the hanger from being forced back off from the beam, and this feature of the hanger is also aided by the width of the blank.

It is proposed to form the hanger by stamping the blanks from sheet metal of any desired thickness, then bending the blank into the U or horseshoe shape, for by so doing the edge of the metal at the point 2 will come in contact with the beam or joist and by reason thereof—that is to say, by presenting the edge of the metal instead of the flat surface—the hanger will be able to resist and support without movement a much greater strain and weight than it could possibly resist if the force of the strain was exerted upon the flat side of the metal. Consequently this method greatly increases the durability and effectiveness of the hanger without increasing its cost or its weight and without the addition of other parts.

The length of the blanks will of course be varied to suit the different sizes of pipe or conduit, and the bend in the blank will be shaped to conform to the pipe or conduit it is designed to support.

What I claim, therefore, and desire to secure by Letters Patent, is—

1. In devices designed as hangers for supporting pipes, conduits and the like, a horseshoe-shaped hanger, having its extremities perforated for the reception of a clamping-bolt and provided at their extremities with flat lateral projections adapted to support the hanger and its weight, and so constructed as to present for contact with the supporting-beam, only the edge portions of the flat surface substantially as shown and described and for the purposes set forth.

2. In conduit-supporting devices, a hanger having a body portion with extremities designed for the reception of a clamping device and flat supporting projections extending laterally from the extremities and so constructed as to present for contact with the supporting-beam only the edge portion of the projection substantially as shown and for the purpose set forth.

JOHN C. LINDNER, Jr.

Witnesses:
JAMES D. ROBERTSON,
SILAS J. DOUGLASS.